(No Model.)

A. W. EHLE.
Nose Ring for Animals.

No. 234,861. Patented Nov. 30, 1880.

Witnesses. Charles Selkirk. Richard P. Duncan

Alonzo W. Ehle.
Inventor
by his Attorney
Alex. Selkirk

UNITED STATES PATENT OFFICE.

ALONZO W. EHLE, OF CANAJOHARIE, NEW YORK.

NOSE-RING FOR ANIMALS.

SPECIFICATION forming part of Letters Patent No. 234,861, dated November 30, 1880.

Application filed April 30, 1880. (No model.)

*To all whom it may concern:*

Be it known that I, ALONZO W. EHLE, of Canajoharie, county of Montgomery, and State of New York, have invented a certain new and useful Improvement in Nose-Rings for Animals, of which the following is a specification.

My invention relates to a nose-ring for animals in which two curved limbs are jointed together at their contacting ends, and the opposite ends are free and provided with smooth and convex form of bosses, which free ends are distended or drawn together by a thumb-bolt working through one of said limbs and into a screw-threaded hole in the other.

The object of my invention is to produce a nose-ring which will be held securely in the nose of the animal without the employment of a hole in the nose. I attain this object by the employment of the device illustrated in the accompanying drawings, in which—

Figure 1:
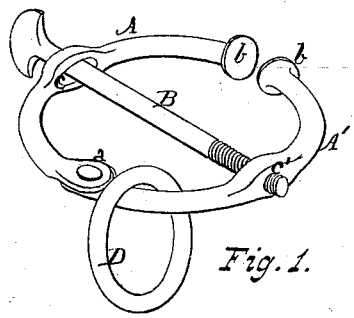
Figure 2:
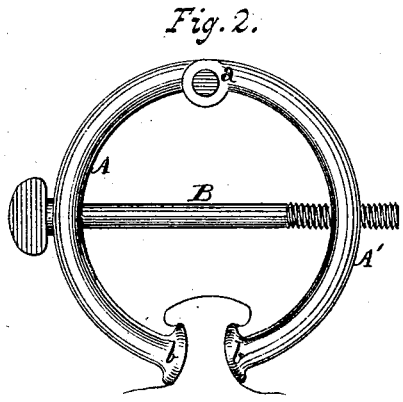
Figure 3:
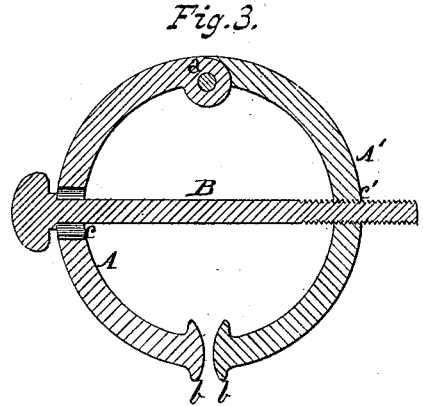

Figure 1 represents a perspective view of the nose-ring. Fig. 3 is a sectional view, and Fig. 2 is a side view, illustrating the nose-ring when applied to the nose of an animal.

Similar letters refer to similar parts throughout the several views.

The nose-ring is composed of the limbs or sections A and A', hinged together at $a$, and having their free ends provided with bosses $b$ $b$, made with a smooth and convex form, as shown.

Made nearly in the middle of the bow of the limb A of the ring is an oblong hole, $c$, for receiving the screw-bolt B. Made in limb A', at a point opposite the oblong hole $c$ in limb A, is the screw-threaded hole $c'$, which receives the screw-threaded end of bolt B.

D is a solid ring, secured in the section of the nose-ring between bolt B and the pivoted ends of the limb of the same.

When the bolt B is turned in one direction in the screw-threaded opening $c'$ in limb A', with the shoulder of the thumb-piece $d$ being on limb A, the two limbs will be drawn together, and will cause the smooth and convex bosses $b$ $b$ to approach each other, and when said bolt is turned in an opposite direction the said limbs may have their free ends and bosses opened or thrown apart.

When it is desired to apply the ring to the nose of an animal—say a bull—the operator will turn the screw-bolt B so as to open the clamping ends of the limbs A A', as shown in Fig. 1. He will then insert the free and bossed ends of the distended limbs of the ring in the nostrils of the animal and turn the screw-bolt, so as to close the said bossed ends against the division-piece of the nostril, when the nose-ring will be securely fixed to the nose.

It will be readily observed that by my improvement the nose-ring will be made to securely engage with the nose of the animal without making a hole in the same, and that all draft on the halter-ring D will be sustained by the pivot $a$ and bolt B, and will not in the least affect the free ends of the limbs A A' to draw them apart.

Having described my invention, what I claim, and desire to secure by Letters Patent, is—

In a nose-ring, the combination, with the jointed sections A A', provided with bosses $b$ $b$ on the free ends, of the screw-bolt B, working through an oblong hole, $c$, made in one of said sections and a screw-threaded hole made in the other section, all constructed and arranged for operation substantially as and for the purpose set forth.

ALONZO W. EHLE.

Witnesses:
 GEO. H. REED,
 JOHN L. REED.